E. J. SCHMIDT.
PRESSURE REGULATOR.
APPLICATION FILED MAR. 15, 1919.
1,343,160.
Patented June 8, 1920.
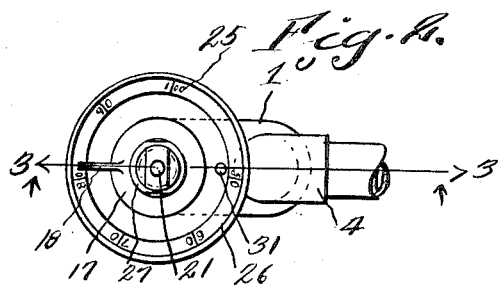
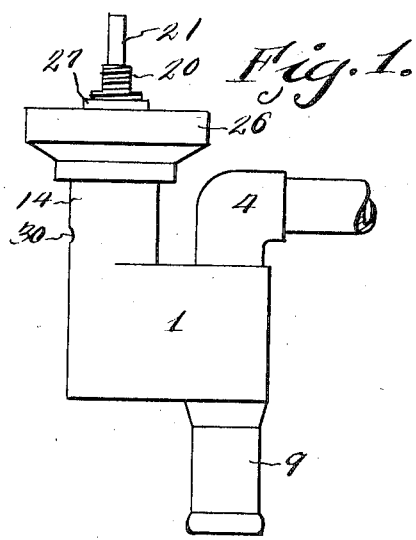
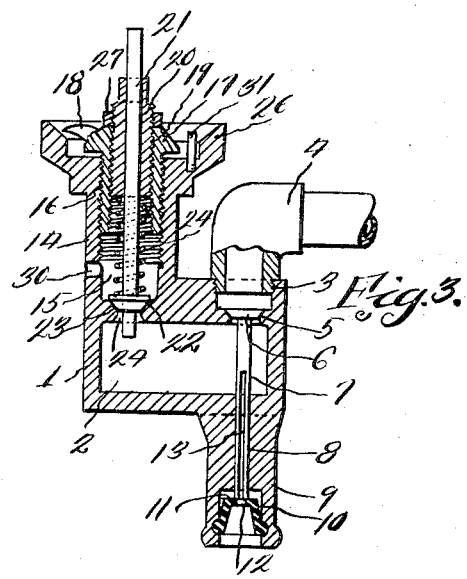
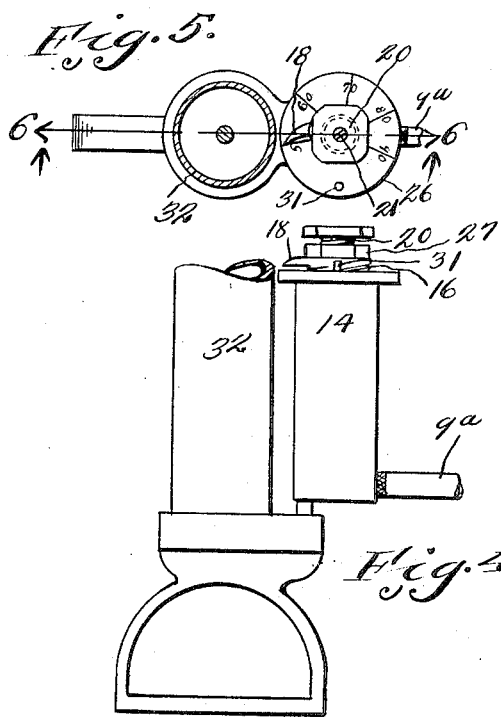
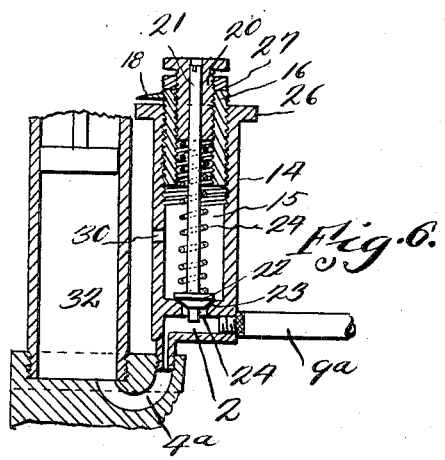
Inventor
E. J. Schmidt
By D. Swift & Co.
Attorneys

UNITED STATES PATENT OFFICE.

EDWARD J. SCHMIDT, OF LOUISVILLE, KENTUCKY.

PRESSURE-REGULATOR.

1,343,160.           Specification of Letters Patent.         Patented June 8, 1920.

Application filed March 15, 1919. Serial No. 282,860.

*To all whom it may concern:*

Be it known that I, EDWARD J. SCHMIDT, a citizen of the United States, residing at Louisville, in the county of Jefferson, State of Kentucky, have invented a new and useful Pressure-Regulator, and I do hereby declare the following to be a full, clear, and exact description of the invention, such as will enable others skilled in the art to which it appertains to make and use the same.

The invention relates to pressure regulators and has for its object to provide a pressure regulator adapted to be attached to the supply pipe, through which pipe air is supplied for inflating pneumatic resilient tires, said regulator being so constructed that it can be set so as to allow the air pressure above a predetermined pressure to exhaust to the atmosphere so that the tire will not be over-inflated, which causes damage to the same.

A further object is to provide a pressure regulator of this character, wherein the intake valve is unseated by the placing of the device on the stem of the tire, which unseating allows the air to pass into a chamber and thence into the tire and to provide a spring actuated valve engaging a valve seat in an aperture which communicates with the chamber and means whereby the tension of the spring may be increased or diminished for regulating the pressure necessary in the chamber, for raising the spring actuated valve so as to allow the air pressure above a predetermined pressure to escape to the atmosphere.

With the above and other objects in view the invention resides in the combination and arrangement of parts as hereinafter set forth, shown in the drawings, described and claimed, it being understood that changes in the precise embodiment of the invention may be made within the scope of what is claimed, without departing from the spirit of the invention.

In the drawings:—

Figure 1 is a side elevation of the device.

Fig. 2 is a top plan view of the same.

Fig. 3 is a sectional view taken on line 3—3 of Fig. 2.

Fig. 4 is a side elevation of the pressure regulator applied to a pump.

Fig. 5 is a top plan view of Fig. 4.

Fig. 6 is a vertical sectional view taken on line 6—6 of Fig. 5.

Referring to the drawings the numeral 1 designates a casing and 2 a chamber therein. Threaded in the casing as at 3 is a supply pipe 4, which may lead to any suitable source of air supply, such as a tank or pump. Adjacent the intake of the supply pipe a valve seat 5 is formed in the casing which is adapted to be coöperated with by a valve 6 which is provided with a depending valve stem 7, the lower end of which is slidably mounted in an aperture 8 of the depending boss 9 which is preferably formed integral with the casing 1. The boss 9 is counterbored as at 10 and the lower end of the stem 7 extends into said counter bore and engages a flexible washer 11, which is provided with an aperture 12, through which the air passes when the upper end of the tire valve is forced into the counterbore of the boss 9, the portion of the flexible washer which engages the end of the valve stem will force the stem upwardly thereby unseating the valve 6 from its seat. When the valve 6 is unseated the air from the source of supply is allowed to pass into the chamber 2 of the casing 1, thence through the slot 13 in the valve stem 7 and thence through the aperture 12 in the washer and enter the stem of the valve stem of the tire, opening the valve therein and then enters the tire.

The pressure regulator comprises the cylindrical extension 14, which is provided with a chamber 15 which is internally threaded and threaded in said chamber 15 is a sleeve 16 having an enlarged head 17 which is provided with an indicator pointer 18. Threaded into the sleeve 16 as at 19 is a sleeve 20 having a bore therein for the reception of the valve stem 21 which is adapted to slide vertically therein. The lower end of the valve stem is provided with a valve 22 which normally seats in the valve seat 23 formed in the passage 24 which communicates with the chamber 2 of the casing. A coiled spring 24 is disposed between the valve 22 and the lower end of the sleeve 20, the tension of the spring 24 being increased or diminished by the inward or outward adjustment of the sleeve 20, this adjustment being used when the pointer 18 is being properly positioned relative to the indicating marks 25 on the flange 26 of the cylindrical casing 14. When this adjustment is made the lock nut 27 is set up on so that the sleeves 16 and 20 will be locked in relation to each other. If it is desired to allow the pressure in the tire to be eighty pounds, the pointer is turned to that indication mark on the dial, which turning action will compress the spring 24 until the same is so tensioned that it will require eighty pounds of pressure to raise the valve 22 and allow the excess pressure to pass into the chamber 15, thence to the atmosphere through the exhaust port 30. The setting of the pointer when it is desired to reduce the pressure being accomplished by moving the pointer in the other direction, however a pin 31 is provided which prevents the pointer from being turned all the way around, which would throw the adjusting means out of proper position.

Referring to Figs. 4, 5 and 6, it will be noted that the structure is practically the same as in the other figures, with the exception that the pressure regulator is so constructed that it may be applied to a foot pump 32, which forces the air through a passage 4ª and into the chamber 2, from which chamber it passes through the tube 9ª which leads to the tire valve and stem.

It will be seen that when the pressure in the tire and chamber 2 reaches the desired amount, the valve 22 will be raised and the air or excess pressure will pass into the chamber 15 and escape through the port 30. This escaping of the air will cause a noise which will indicate to the operator that the pressure is of the desired amount and then he removes the casing as a whole from the valve stem of the tire.

The invention having been set forth what is claimed as new and useful is:—

1. In a device as characterized, a cylindrical casing open at one end and closed at the other end, internal screw threads at said open end, an external and an internal screw threaded sleeve fitted in the end of said casing, a second sleeve threaded in said first mentioned sleeve, the closed end having a port therethrough, a valve closing said port, a stem extending from said valve and slidably received in said second mentioned sleeve and a spring disposed about said stem and bearing respectively upon said valve and the inner end of said last mentioned sleeve.

2. In a device as characterized, a chambered casing, an air supply port, a discharge port, a relief valve comprising a pair of threaded sleeves, one threaded within the other, and the outer sleeve threaded in a cylindrical chamber, a valve stem slidably mounted in the inner sleeve, means for locking the sleeves in relation to each other, a dial on the end of said chamber, a valve on said stem, a spring disposed about said stem and bearing respectively on said valve and one of said sleeves, a pointer carried on the last named sleeve adapted to be placed in registration with indication marks on said dial, which placing of the pointer serves to regulate the tension of the spring.

In testimony whereof I have signed my name to this specification.

EDWARD J. SCHMIDT.